(12) United States Patent
Jeddeloh

(10) Patent No.: US 6,275,914 B1
(45) Date of Patent: Aug. 14, 2001

(54) APPARATUS FOR PRESERVING MEMORY REQUEST ORDERING ACROSS MULTIPLE MEMORY CONTROLLERS

(75) Inventor: Joseph M. Jeddeloh, Minneapolis, MN (US)

(73) Assignee: Micron Technology, Inc, Boise, ID (US)

(*) Notice: Subject to any disclaimer, the term of this patent is extended or adjusted under 35 U.S.C. 154(b) by 0 days.

(21) Appl. No.: 09/418,467

(22) Filed: Oct. 15, 1999

(51) Int. Cl.$^7$ ........................................... G06F 13/18
(52) U.S. Cl. .......................... 711/158; 711/168; 711/210; 710/5
(58) Field of Search ................................. 710/39–40, 52, 710/54, 112, 240, 244, 5, 6; 711/154, 158, 168, 210; 709/201, 229

(56) References Cited

U.S. PATENT DOCUMENTS

| | | | | |
|---|---|---|---|---|
| 4,733,352 | * | 3/1988 | Nakamura et al. | 711/152 |
| 5,442,755 | * | 8/1995 | Shibata | 710/108 |
| 5,603,005 | * | 2/1997 | Bauman et al. | 711/124 |
| 6,167,492 | * | 12/2000 | Keller et al. | 711/154 |

* cited by examiner

Primary Examiner—Matthew Kim
Assistant Examiner—Denise Tran
(74) Attorney, Agent, or Firm—Park, Vaughan & Fleming LLP

(57) ABSTRACT

One embodiment of the present invention provides an apparatus that preserves ordering of memory requests distributed across multiple memory controllers. The apparatus includes a first memory controller containing a receiving circuit that is configured to receive a memory request that includes a source tag indicating a source from which the memory request originated. (For example, a source tag may identify a processor or a graphics accelerator.) The apparatus also includes a comparison circuit that compares the source tag with source tags for pending memory requests in a second memory controller to determine if the second memory controller contains any pending memory requests from the same source. Note that the source tags for the second memory controller are contained within a storage area in the first memory controller. The apparatus also includes a request order enforcement circuit that is configured to prevent the memory request from issuing from the first memory controller before the pending memory requests from the same source within the second memory controller complete. The apparatus additionally includes an issuing circuit that is configured to issue the memory request from the first memory controller to a first random access memory coupled to the first memory controller.

21 Claims, 4 Drawing Sheets

APPARATUS FOR PRESERVING MEMORY REQUEST ORDERING ACROSS MULTIPLE MEMORY CONTROLLERS

RELATED APPLICATION

The subject matter of this application is related to the subject matter in a co-pending non-provisional application by the same inventor(s) as the instant application and filed on the same day as the instant application entitled, "Method for Preserving Memory Request Ordering Across Multiple Memory Controllers," having Ser. No. 09/418,466 and filing date Oct. 15, 1999.

BACKGROUND

1. Field of the Invention

The present invention relates to memory architectures for computer systems. More specifically, the present invention relates to a method and an apparatus for preserving the ordering of memory requests directed to multiple memory controllers.

2. Related Art

As computer systems grow increasingly more sophisticated, they are beginning to include multiple functional units. For example, it is common for a computer system to include one or more central processing units (CPUs) as well as a graphics processor and various DMA devices. As the number of functional units in a computer system increases, the computer system's memory comes under increasing pressure to service memory requests. Consequently, the memory can become a bottleneck to computer system performance.

One solution to this problem is to incorporate multiple memory channels in a computer system, wherein each memory channel handles accesses to a different region of memory. These multiple memory channels can work in parallel to service memory requests from the multiple functional units.

In designing a system with multiple memory channels, it is important to allow each functional unit to access to all of the memory channels, so that each functional unit can access all of the regions of memory. One problem in doing so is that memory requests from a given functional unit may return out of order from different memory controllers. This can create problems if there are dependencies between the memory requests. One solution to this problem is to provide additional circuitry at the functional unit to ensure that memory requests are executed in order. However, this complicates the design of the functional unit and may limit the performance advantages of queuing requests at memory controllers.

Another solution is to include circuitry within the memory controllers to ensure that requests from a given functional unit are issued in order. This simplifies the design of functional units and can improve overall computer system performance. However, this requires the memory controllers to communicate information with each other, which can cause prohibitively large communication delays.

What is needed is a method and an apparatus that enables multiple memory controllers to ensure that requests from functional units are issued in order without incurring large communication delays.

SUMMARY

One embodiment of the present invention provides an apparatus that preserves ordering of memory requests distributed across multiple memory controllers. The apparatus includes a first memory controller containing a receiving circuit that is configured to receive a memory request that includes a source tag indicating a source from which the memory request originated. For example, a source tag may identify a processor or a graphics accelerator. The apparatus also includes a comparison circuit that compares the source tag with source tags for pending memory requests in a second memory controller to determine if the second memory controller contains any pending memory requests from the same source. Note that the source tags for the second memory controller are contained within a storage area in the first memory controller. The apparatus also includes a request order enforcement circuit that is configured to prevent the memory request from issuing from the first memory controller before the pending memory requests from the same source within the second memory controller complete. The apparatus additionally includes an issuing circuit that is configured to issue the memory request from the first memory controller to a first random access memory coupled to the first memory controller.

In one embodiment of the present invention, the apparatus additionally includes a propagation circuit that is configured to propagate the source tag for the memory request to the second memory controller so that the second memory controller can compare source tags for subsequent requests received at the second memory controller against source tags for pending memory requests in the first memory controller.

In one embodiment of the present invention, the storage area within the first memory controller for storing the source tags from the second memory controller is organized as a FIFO circuit.

In one embodiment of the present invention, the comparison circuit is further configured to compare the source tag with source tags for pending memory requests in a third memory controller to determine if the third memory controller contains any pending memory requests from the same source. Additionally, the it request order enforcement circuit is further configured to prevent the memory request from completing until the pending memory requests from the same source within the third memory controller complete.

In one embodiment of the present invention, the request order enforcement circuit is configured to stall the first memory controller until the pending memory requests within the second memory controller from the same source complete.

In one embodiment of the present invention, the request order enforcement circuit is configured to stall pending memory requests in the first memory controller.

In one embodiment of the present invention, the receiving circuit is further configured to receive a time stamp associated with the memory request, and the comparison circuit is further configured to compare the time stamp associated with the memory request against time stamps associated with the pending memory requests in the second memory controller.

In one embodiment of the present invention, the issuing circuit is further configured to receive a response from the first random access memory indicating that the memory request has been completed, and to return read data to the source from which the memory request originated if the memory request is a read operation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Computer System

Figure 1:
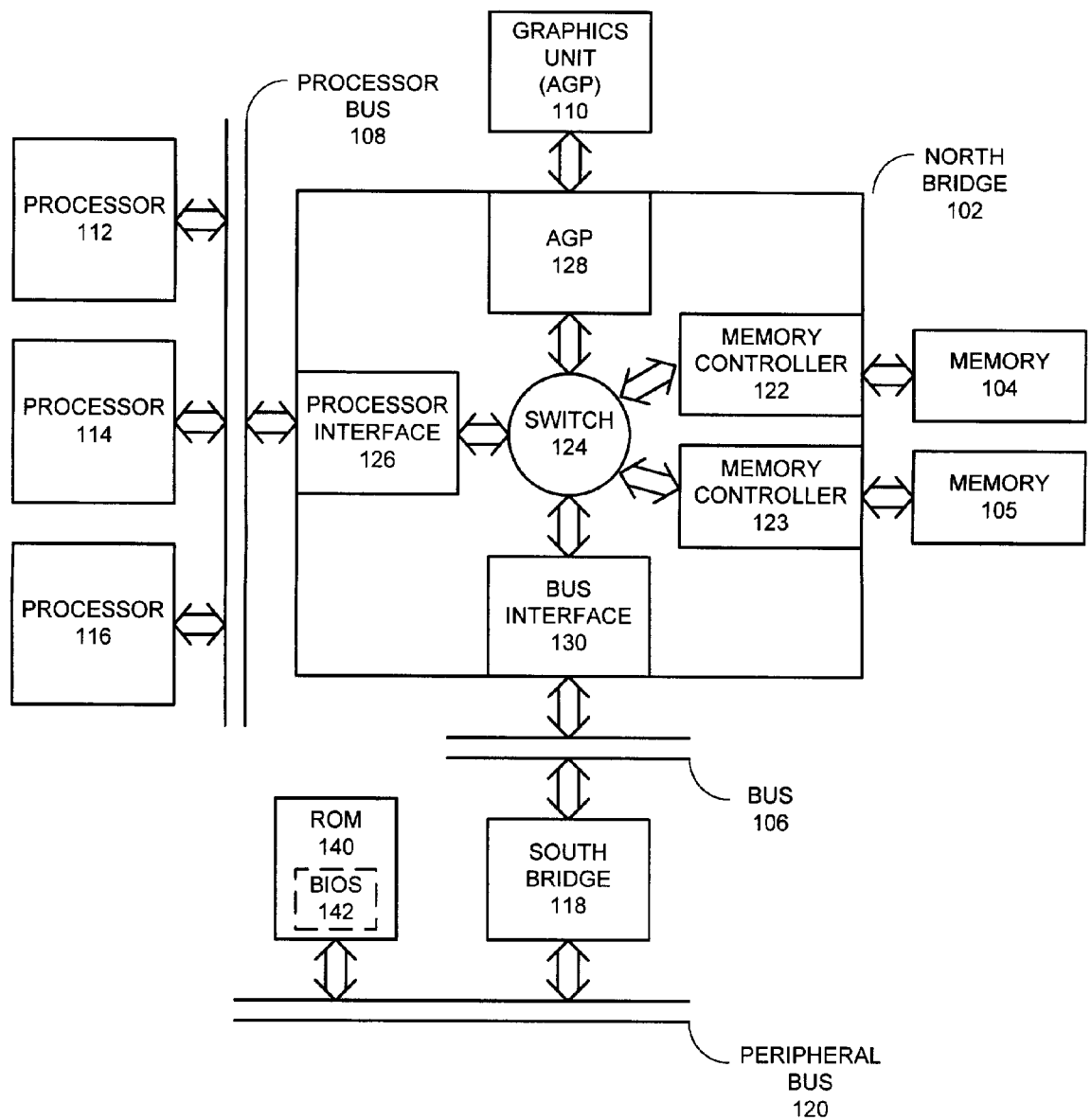
FIG. 1 illustrates a computer system in accordance with an embodiment of the present invention.

FIG. 1 illustrates a computer system in accordance with an embodiment of the present invention. The computer system illustrated in FIG. 1 includes processors 112, 114 and 116, which are coupled to processor bus 108. Processors 112, 114 and 116 can include any type of general or special purpose processors, including, but not limited to microprocessors, mainframe computers, digital signal processors, graphics processors and device controllers. Processor bus 108 can include any type of communication channel for coupling a processor to other devices in the computer system, including peripheral devices, memory devices and other processors.

North bridge 102 couples processor bus 108 to, memory 104, memory 105, graphics unit 110 and bus 106. As illustrated in FIG. 1, north bridge 102 contains: processor interface 126 for communicating with processor bus 108; accelerated graphics port (AGP) 128 for communicating with graphics unit 110; memory controller 122 for communicating with memory 104; memory controller 123 for communicating with memory 105; and bus interface 130 for communicating with bus 106. Interfaces 126, 128, 130 and memory controllers 122 and 123 are coupled together through switch 124. Switch 124 can include any type of switching circuitry that is able to selectively couple together to interfaces 126, 128, 130 and memory controllers 122 and 123.

Memories 104 and 105 can include any type of volatile or non-volatile random access memory.

Graphics unit 110 can include any special-purpose circuitry for performing graphics operations. This allows graphics computations to be off-loaded from processors 112,114 and 116.

Bus 106 couples north bridge 102 to south bridge 118. Bus 106 can include any type of communication channel for coupling north bridge 102 to other devices in a computer system, including peripheral devices and memory devices. In one embodiment of the present invention, bus 106 is a PCI bus.

South bridge 118 includes circuitry for coupling together components of the computer system. More, particularly, south bridge 118 couples bus 106 to peripheral bus 120.

Peripheral bus 120 can include any type of communication channel for coupling a south bridge 118 to other devices in a computer system, including peripheral devices and memory devices. In one embodiment of the present invention, peripheral bus 120 is an ISA bus. Peripheral bus 120 is coupled to ROM 140, which contains BIOS 142.

The embodiment illustrated in FIG. 1 operates as follows in processing a read memory request. First, a processor, such as processor 112, performs a read operation. This read operation is relayed across processor bus 108 into one of memory controllers 122 or 123 within north bridge 102. Consider the case where the read request is directed to memory controller 122. Memory controller 122 issues the read request to memory 104. In response to this read request, memory 104 returns the read data to memory controller 122. Next, the read operation is completed by transferring data across processor bus 108 to processor 112.

Memory Controller

Figure 2:
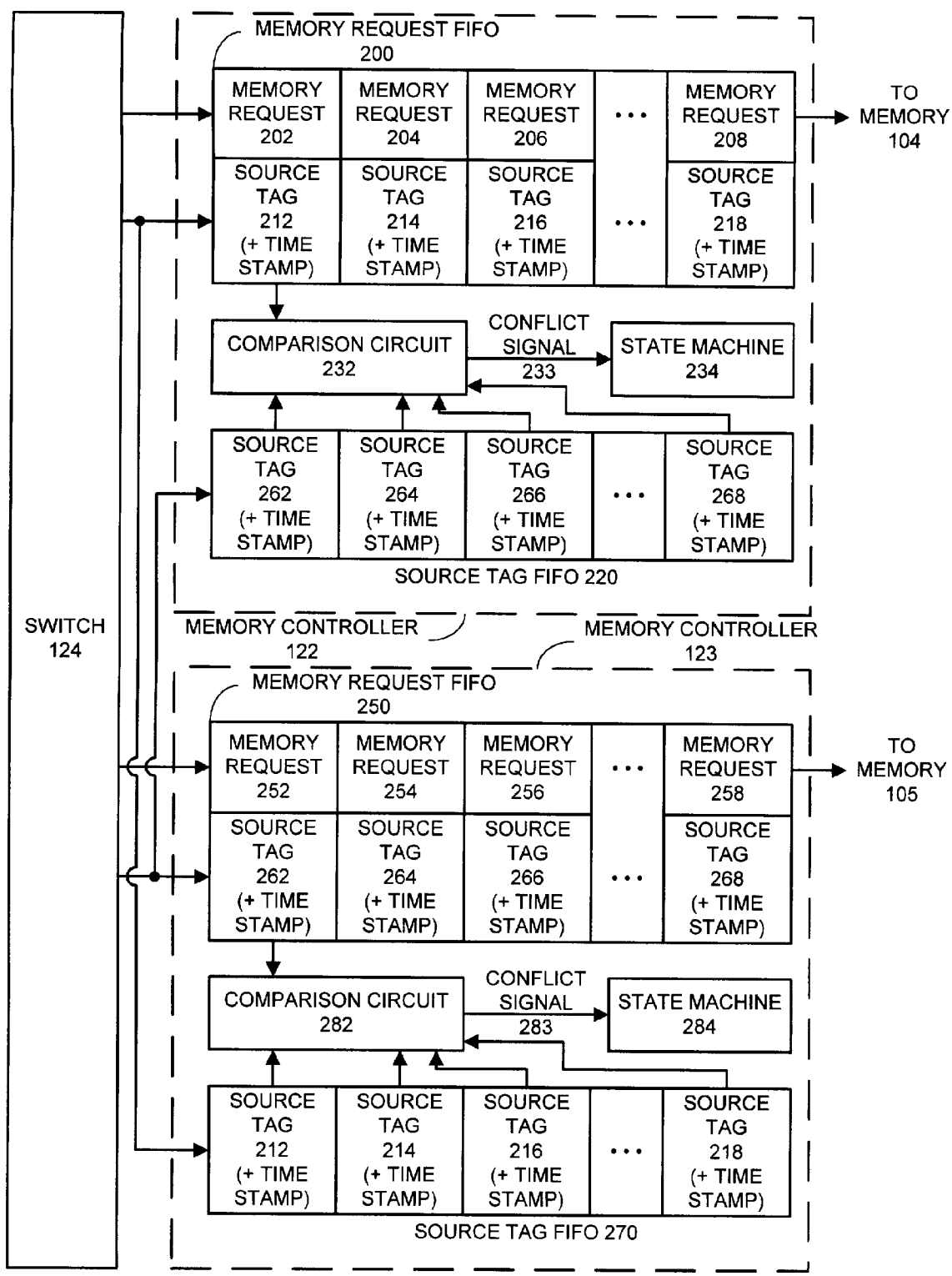
FIG. 2 illustrates the internal structure of two memory controllers in accordance with an embodiment of the present invention.

FIG. 2 illustrates the internal structure of two memory controllers 122 and 123 in accordance with an embodiment of the present invention. FIG. 2 illustrates in more detail the internal structures of memory controllers 122 and 123 illustrated in FIG. 1.

Memory controller 122 includes memory request FIFO 200, source tag FIFO 220 and state machine 234. Memory request FIFO 200 includes entries for pending memory requests in memory controller 122, including memory requests 202, 204, 206 and 208. Memory request FIFO 200 additionally includes source tags associated with each memory request that identify the functional unit in the computer system that initiated the memory request. More specifically, memory request FIFO 200 includes source tags 212, 214, 216 and 218, which are associated with memory requests 202, 204, 206 and 208, respectively.

Source tag FIFO 220 includes source tags for memory requests that are currently pending in memory controller 123. More specifically, source tag FIFO 220 includes source tags 262, 264, 266 and 268, which are associated with memory requests 252, 254, 256 and 258 within memory request FIFO 250 in memory controller 123.

Comparison circuit 232 is used to compare source tag 212 (associated with memory request 202) with source tags 262, 264, 266 and 268 (associated with memory requests 252, 254, 256 and 258 within memory controller 123). If source tag 212 matches any of source tags 262, 264, 266 and 268, comparison circuit 232 asserts conflict signal 233, which feeds into state machine 234.

State machine 234 controls the actions of memory controller 122. This includes stalling memory controller 122 when conflict signal 233 is asserted, so that a memory request does not issue until preceding memory requests from the same source complete.

In one embodiment of the present invention, the source tags additionally include time stamps, and the comparison operation involves determining if any preceding memory requests from the same source are present in the other memory controller.

Similarly, memory controller 123 includes memory request FIFO 250, source tag FIFO 270 and state machine 284. Memory request FIFO 250 includes entries for a number of pending memory requests, including memory requests 252, 254, 256 and 258. Memory request FIFO 250 additionally includes source tags 262, 264, 266 and 268, which are associated with memory requests 252, 254, 256 and 258, respectively.

Source tag FIFO 270 includes source tags for memory requests that are currently pending in memory controller 122. More specifically, source tag FIFO 270 includes source tags 212, 214, 216 and 218, which are associated with memory requests 202, 204, 206 and 208 within memory request FIFO 200 in memory controller 122.

Comparison circuit 282 is used to compare source tag 262 (associated with memory request 252) with source tags 212, 214, 216 and 218 (associated with memory requests 202, 204, 206 and 208 within memory controller 122). If source tag 262 matches any of source tags 212, 214, 216 and 218, comparison circuit 282 asserts conflict signal 283, which feeds into state machine 284.

State machine 284 controls the actions of memory controller 123. This includes stalling memory controller 123 when conflict signal 283 is asserted so that a memory request does not issue until preceding memory requests from the same source complete.

Comparison Circuit

Figure 3:
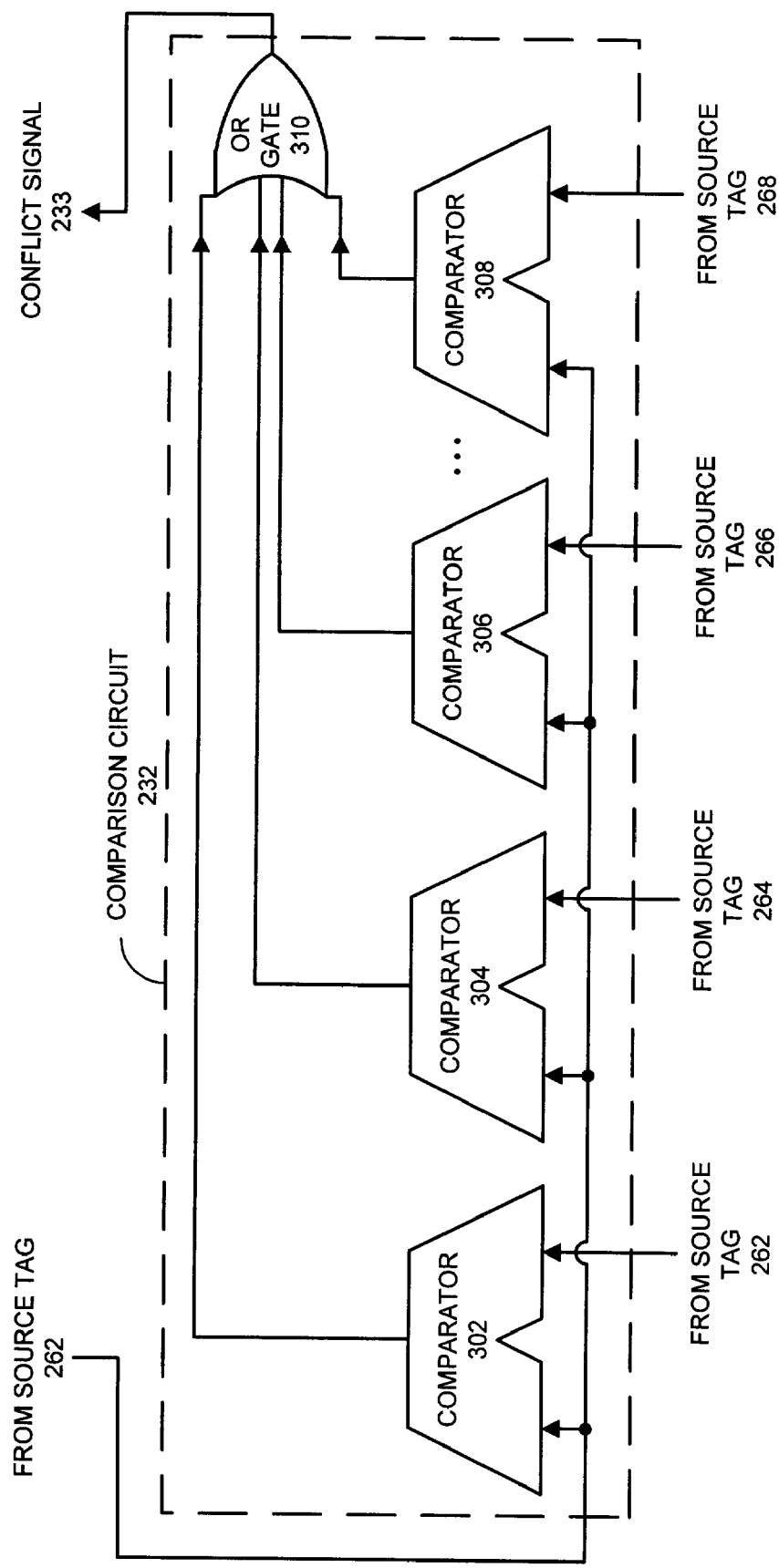
FIG. 3 illustrates the internal structure of a comparison circuit in accordance with an embodiment of the present invention.

FIG. 3 illustrates the internal structure of comparison circuit 232 (from FIG. 2) in accordance with an embodiment of the present invention. Comparison circuit 232 takes in source tag 212 (on the left-hand side of FIG. 3), and compares source tag 212 with source tags 262, 264, 266 and 268, respectively, from source tag FIFO 220. These comparisons take place within comparators 302, 304, 306 and 308. If any of source tags 262, 264, 266 and 268 match source tag 212, OR gate 316 asserts conflict signal 233.

Note that if the source tags include time stamps, comparators 302, 304, 306 and 308 generate a matching signal only if source tags 262, 264, 266 and 268, respectively, precede the time stamp for source tag 212 and originate from the same source as source tag 212.

Processing a Memory Request

Figure 4:
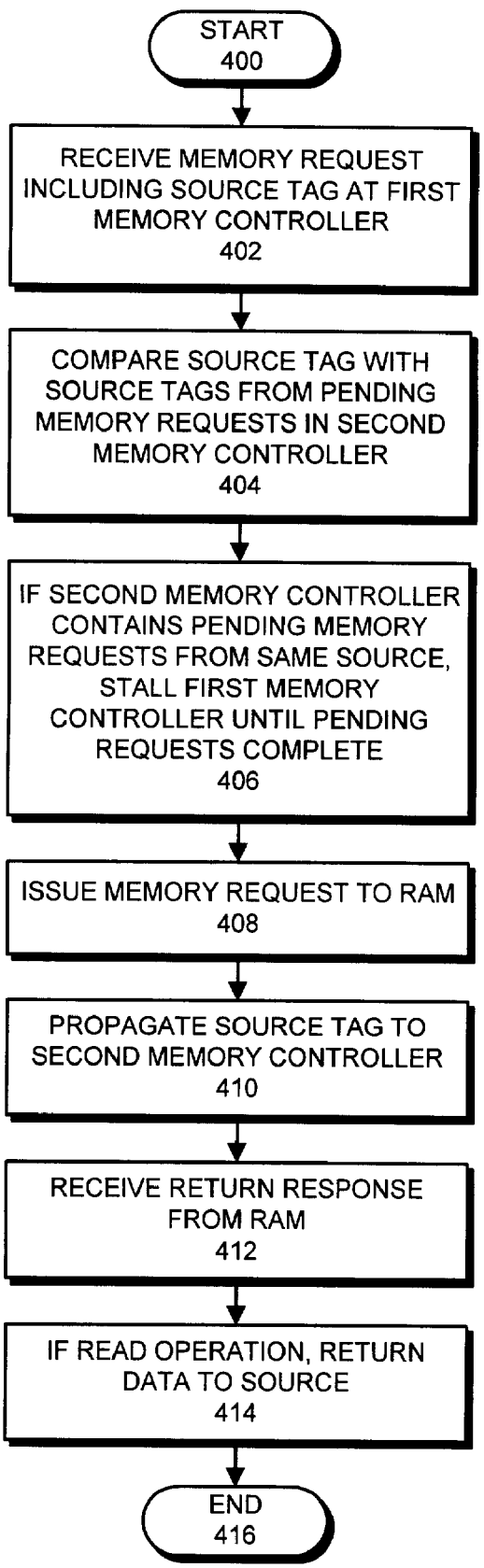
FIG. 4 is a flow chart illustrating how a memory controller processes a memory request in accordance with an embodiment of the present invention.

FIG. 4 is a flow chart illustrating how memory controller 122 processes a memory request 202 in accordance with an embodiment of the present invention. The system first receives a memory request 202 at memory controller 122 (step 402). Memory request 202 includes a source tag 212 identifying the functional unit that initiated memory request 202. Next, the system compares source tag 212 for memory request 202 against source tags 262, 264, 266 and 268 for pending memory requests in memory controller 123 (step 404). If memory controller 123 contains pending memory requests from the same source (meaning source tag 212 matched one of source tags 262, 264, 266 and 268), state machine 234 stalls memory controller 122 until all pending requests from the same source within memory controller 123 complete (step 406).

Note that this stalling may occur at a number of different times. In one embodiment of the present invention, memory controller 122 stalls immediately after it receives a memory request that conflicts with a pending request in memory controller 123. In another embodiment, memory controller 122 does not stall immediately after receiving a conflicting memory request, but rather waits to stall until a memory request that is about to issue to (or return from) memory 104 conflicts with preceding memory requests within other memory controllers. This embodiment requires including time stamps within the source tags to specify which memory requests precede other memory requests. Next, the system issues memory request 202 to memory 104 (step 408).

The system also propagates source tag 212 to source tag FIFO 270 within memory controller 123 (step 410) so that memory controller 123 can compare source tags for subsequent requests received at memory controller 123 against source tags for pending memory requests in memory controller 122. Note that this propagation step can take place at any time during the processing of memory request 202.

At some time later, the system receives a response from memory 104 indicating that the memory operation is complete (step 412). If memory request 202 is a read operation, memory controller 122 returns the read data to the functional unit that requested the read operation.

Note that the present invention can be extended to more than two memory controllers by expanding the source tag FIFOs to include source tags from all of the other memory controllers. The comparison circuits also have to be extended to accommodate additional comparisons.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. An apparatus that preserves ordering of memory requests distributed across multiple memory controllers, comprising:

a first memory controller;

a receiving circuit within the first memory controller that is configured to receive a memory request including a source tag indicating a source from which the memory request originated;

a comparison circuit that compares the source tag with source tags for pending memory requests in a second memory controller to determine if the second memory controller contains any pending memory requests from the same source;

a storage area within the first memory controller for storing the source tags for the second memory controller;

a request order enforcement circuit that is configured to prevent the memory request from issuing from the first memory controller before the pending memory requests from the same source within the second memory controller complete; and an issuing circuit that is configured to issue the memory request from the first memory controller to a first random access memory coupled to the first memory controller.

2. The apparatus of claim 1, further comprising a propagation circuit that is configured to propagate the source tag for the memory request to the second memory controller so that the second memory controller can compare source tags for subsequent requests received at the second memory controller against source tags for pending memory requests in the first memory controller.

3. The apparatus of claim 1, wherein the storage area within the first memory controller for storing the source tags from the second memory controller is organized as a FIFO circuit.

4. The apparatus of claim 1, wherein the comparison circuit is further configured to compare the source tag with source tags for pending memory requests in a third memory controller to determine if the third memory controller contains any pending memory requests from the same source; and wherein the request order enforcement circuit is further configured to prevent the memory request from completing until the pending memory requests from the same source within the third memory controller complete.

5. The apparatus of claim 1, wherein the request order enforcement circuit is configured to stall the first memory controller until the pending memory requests within the second memory controller from the same source complete.

6. The apparatus of claim 5, wherein the request order enforcement circuit is configured to stall pending memory requests in the first memory controller.

7. The apparatus of claim 1, wherein the receiving circuit is further configured to receive a time stamp associated with the memory request, and wherein the comparison circuit is further configured to compare the time stamp associated with the memory request against time stamps associated with the pending memory requests in the second memory controller.

8. The apparatus of claim 1, wherein the first memory controller and the second memory controller are located within a core logic chip.

9. The apparatus of claim 1, wherein the first random access memory is separate from a second random access memory that is coupled to the second memory controller.

10. The apparatus of claim 1, wherein the issuing circuit is further configured to:

receive a response from the first random access memory indicating that the memory request has been completed; and to return read data to the source from which the memory request originated if the memory request is a read operation.

11. The apparatus of claim 1, wherein the receiving circuit is configured to receive the memory request from a processor.

12. The apparatus of claim 1, wherein the receiving circuit is configured to receive the memory request from an AGP bus.

13. An apparatus that preserves ordering of memory requests distributed across multiple memory controllers, comprising:
 a first memory controller;
 a second memory controller;
 a first random access memory coupled to the first memory controller;
 a second random access memory coupled to the second memory controller;
 a receiving circuit within the first memory controller that is configured to receive a memory request including a source tag indicating a source from which the memory request originated;
 a comparison circuit that compares the source tag with source tags for pending memory requests in the second memory controller to determine if the second memory controller contains any pending memory requests from the same source;
 a storage area within the first memory controller for storing the source tags for the second memory controller;
 a request order enforcement circuit that is configured to stall the first memory controller until the pending memory requests within the second memory controller from the same source complete;
 an issuing circuit that is configured to,
  issue the memory request from the first memory controller to the first random access memory,
  receive a response from the first random access memory indicating that the memory request has been completed, and to
  return read data to the source from which the memory request originated if the memory request is a read operation; and
 a propagation circuit that is configured to propagate the source tag for the memory request to the second memory controller so that the second memory controller can compare source tags for subsequent requests received at the second memory controller against source tags for pending memory requests in the first memory controller.

14. The apparatus of claim 13, wherein the storage area within the first memory controller for storing the source tags from the second memory controller is organized as a FIFO circuit.

15. The apparatus of claim 13, wherein the comparison circuit is further configured to compare the source tag with source tags for pending memory requests in a third memory controller to determine if the third memory controller contains any pending memory requests from the same source; and wherein the request order enforcement circuit is further configured to prevent the memory request from completing until the pending memory requests from the same source within the third memory controller complete.

16. The apparatus of claim 13, wherein the request order enforcement circuit is configured to stall pending memory requests in the first memory controller.

17. The apparatus of claim 13, wherein receiving circuit is further configured to receive a time stamp associated with the memory request, and wherein the comparison circuit is further configured to compare the time stamp associated with the memory request against time stamps associated with the pending memory requests in the second memory controller.

18. The apparatus of claim 13, wherein the first memory controller and the second memory controller are located within a core logic chip.

19. The apparatus of claim 13, wherein the receiving circuit is configured to receive the memory request from a processor.

20. The apparatus of claim 13, wherein the receiving circuit is configured to receive the memory request from an AGP bus.

21. A computer system that preserves ordering of memory requests distributed across multiple memory controllers, comprising:
 a processor;
 a secondary storage device;
 a first memory controller;
 a second memory controller;
 a first random access memory coupled to the first memory controller;
 a second random access memory coupled to the second memory controller;
 a receiving circuit within the first memory controller that is configured to receive a memory request including a source tag indicating a source from which the memory request originated;
 a comparison circuit that compares the source tag with source tags for pending memory requests in the second memory controller to determine if the second memory controller contains any pending memory requests from the same source;
 a storage area within the first memory controller for storing the source tags for the second memory controller;
 a request order enforcement circuit that is configured to prevent the memory request from issuing from the first memory controller before the pending memory requests from the same source within the second memory controller complete; and
 an issuing circuit that is configured to issue the memory request from the first memory controller to the first random access memory.

* * * * *